United States Patent
Harada

(10) Patent No.: US 12,479,096 B2
(45) Date of Patent: Nov. 25, 2025

(54) ROBOT INSTALLATION POSITION MEASUREMENT DEVICE, INSTALLATION POSITION MEASUREMENT METHOD, ROBOT CONTROLLER, TEACHING SYSTEM, AND SIMULATOR

(71) Applicant: FANUC CORPORATION, Yamanashi (JP)

(72) Inventor: Kunihiko Harada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 190 days.

(21) Appl. No.: 18/273,387

(22) PCT Filed: Feb. 24, 2022

(86) PCT No.: PCT/JP2022/007600
§ 371 (c)(1),
(2) Date: Jul. 20, 2023

(87) PCT Pub. No.: WO2022/181688
PCT Pub. Date: Sep. 1, 2022

(65) Prior Publication Data
US 2024/0091940 A1 Mar. 21, 2024

(30) Foreign Application Priority Data
Feb. 26, 2021 (JP) .................. 2021-029889

(51) Int. Cl.
 *B25J 13/08* (2006.01)
 *B25J 9/04* (2006.01)
 (Continued)

(52) U.S. Cl.
 CPC .............. *B25J 9/1664* (2013.01); *B25J 9/04* (2013.01); *B25J 9/163* (2013.01); *B25J 19/0037* (2013.01)

(58) Field of Classification Search
 CPC ... B25J 9/1664; B25J 9/04; B25J 9/163; B25J 19/0037; G05B 2219/45104
 See application file for complete search history.

(56) References Cited

U.S. PATENT DOCUMENTS 11,738,402 B2 * 8/2023 Mayer .................... B23K 9/125
219/137 R
11,877,816 B2 * 1/2024 Goswami ............... A61B 34/37
(Continued)

FOREIGN PATENT DOCUMENTS

| CN | 101362335 A | 2/2009 |
|----|-------------|--------|
| CN | 101432079 A | 5/2009 |

(Continued)

OTHER PUBLICATIONS

International Search Report and Written Opinion dated May 10, 2022, for International Patent Application No. PCT/JP2022/007600.
(Continued)

*Primary Examiner* — Dalena Tran
(74) *Attorney, Agent, or Firm* — KARCESKI IP LAW, PLLC

(57) ABSTRACT

A robot installation position measurement device includes a first position information acquisition unit that acquires first position information, which is a three-dimensional command position of a tool center point fixed with respect to a flange at a tip of a robot, in a state in which the robot is positioned in a desired pose, a second position information acquisition unit that acquires, by a three-dimensional measurement instrument installed with a predetermined measurement coordinate system, second position information, which is a three-dimensional actual position of the tool center point in the pose, and a coordinate system correction unit that corrects a robot coordinate system, with which the robot operates, such that a difference between pieces of the first position information and pieces of the second position (Continued)

information acquired in states in which the robot is positioned in multiple different poses becomes small.

12 Claims, 10 Drawing Sheets

(51) Int. Cl.
  *B25J 9/16* (2006.01)
  *B25J 19/00* (2006.01)

(56) References Cited

U.S. PATENT DOCUMENTS

| | | | | |
|---|---|---|---|---|
| 11,885,770 | B2* | 1/2024 | Schnoebelen | G01N 29/225 |
| 11,897,127 | B2* | 2/2024 | DiMaio | A61B 90/94 |
| 2009/0118864 | A1 | 5/2009 | Eldridge et al. | |
| 2021/0138646 | A1* | 5/2021 | Matsushima | B25J 9/1664 |

FOREIGN PATENT DOCUMENTS

| | | |
|---|---|---|
| CN | 102243498 A | 11/2011 |
| CN | 110640746 A | 1/2020 |
| JP | H0386484 A | 4/1991 |
| JP | H04129687 A | 4/1992 |
| JP | 2006110705 A | 4/2006 |
| JP | 2008002867 A | 1/2008 |
| JP | 2011224672 A | 11/2011 |
| JP | 2011230243 A | 11/2011 |
| JP | 2015182144 A | 10/2015 |
| JP | 2019077016 A | 5/2019 |
| WO | 2022025060 A1 | 2/2022 |

OTHER PUBLICATIONS

Chinese Office Action dated Jun. 19, 2025, for Chinese Patent Application No. 202280015780.X.

* cited by examiner

ROBOT INSTALLATION POSITION MEASUREMENT DEVICE, INSTALLATION POSITION MEASUREMENT METHOD, ROBOT CONTROLLER, TEACHING SYSTEM, AND SIMULATOR

CROSS-REFERENCE TO RELATED APPLICATION(S)

This is a National Stage Entry into the United States Patent and Trademark Office from International Patent Application No. PCT/JP2022/007600, filed on Feb. 24, 2022, which relies on and claims priority to Japanese Patent Application No. 2021-029889, filed on Feb. 26, 2021, the entire contents of both of which are incorporated herein by reference.

FIELD OF THE INVENTION

The present disclosure relates to a robot installation position measurement device, an installation position measurement method, a robot controller, a teaching system, and a simulator.

BACKGROUND OF THE INVENTION

A known robot system sets a coordinate system for a robot by using a three-dimensional measurement instrument, such as a laser tracker (for example, see Japanese Unexamined Patent Application, Publication No. 2019-77016). This robot system sets a coordinate system for a robot installed on a reference plane on the basis of: measurement results of the position coordinates, at least in the vertical direction, of three or more measurement points on the reference plane where the robot is installed; and measurement results of the position information of multiple reference reflectors provided on a base of the robot.

With this robot system, it is possible to obtain the coordinate system of the actually installed robot by measurement, and, for example, to correct a coordinate system for the robot ideally set in an offline simulation to an actual coordinate system.

SUMMARY OF THE INVENTION

An aspect of the present disclosure is a robot installation position measurement device including: a first position information acquisition unit that acquires first position information, which is a three-dimensional command position of a tool center point fixed with respect to a flange at a tip of a robot, in a state in which the robot is positioned in a desired pose; a second position information acquisition unit that acquires, by a three-dimensional measurement instrument installed with a predetermined measurement coordinate system, second position information, which is a three-dimensional actual position of the tool center point in the pose; and a coordinate system correction unit that corrects a robot coordinate system, with which the robot operates, such that a difference between pieces of the first position information and pieces of the second position information acquired in states in which the robot is positioned in multiple different poses becomes small.

DESCRIPTION OF EMBODIMENT(S) OF THE INVENTION

For example, when a production cell is complicated, it may be difficult to measure the measurement points on the reference plane where the robot is installed and the position information of the reference reflectors provided on the base of the robot with a three-dimensional measurement instrument, due to being blocked by peripheral devices or the like. Hence, there has been a demand for accurately setting a coordinate system for a robot even when it is difficult to measure the measurement points on the reference plane or the reference reflectors provided on the base of the robot with a three-dimensional measurement instrument.

A robot installation position measurement device 1 and an installation position measurement method according to an embodiment of the present disclosure will be described below with reference to the drawings.

Figure 1:
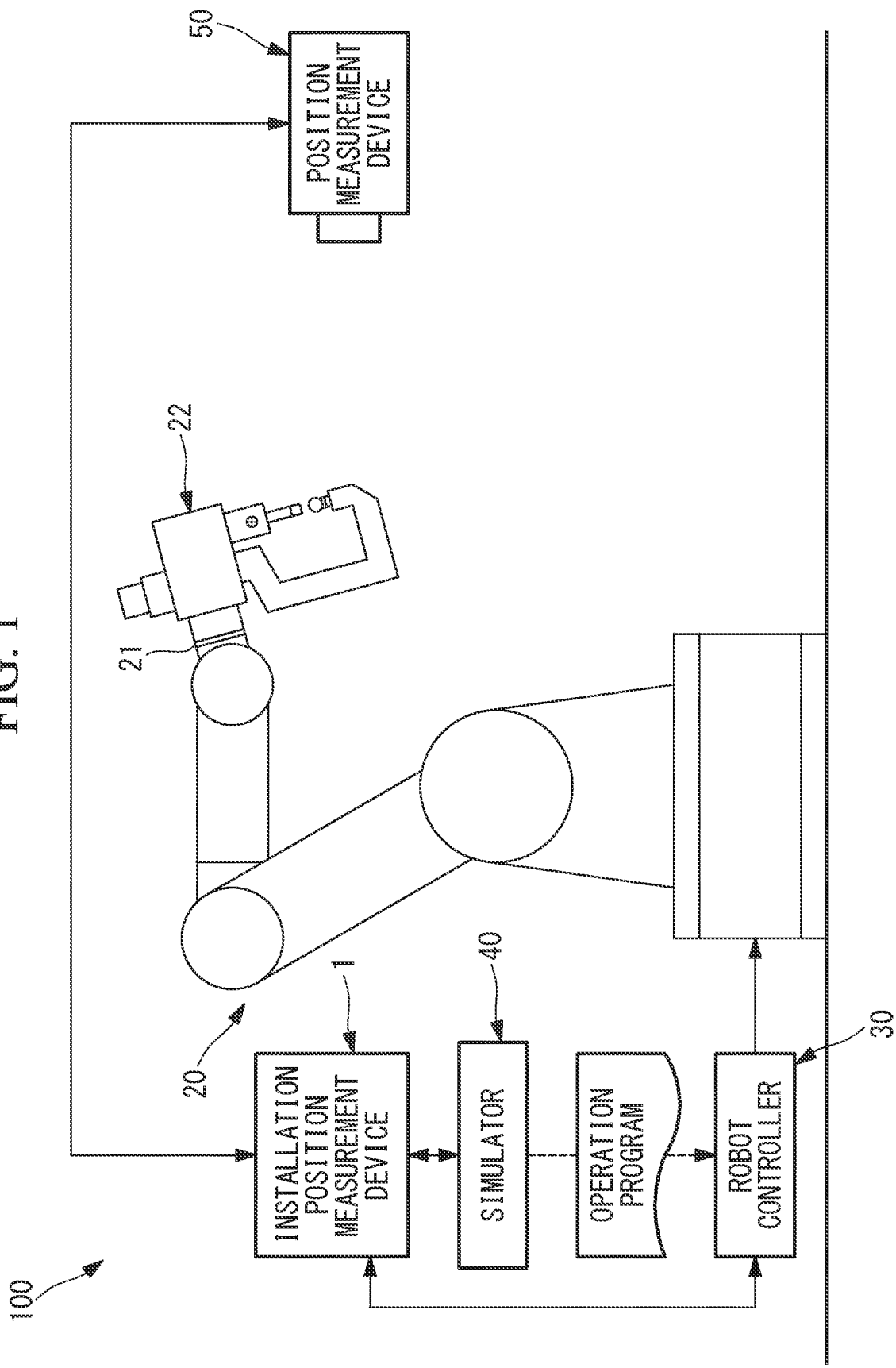
FIG. 1 shows the overall configuration of a robot system including an installation position measurement device according to an embodiment of the present disclosure.

As shown in FIG. 1, the robot installation position measurement device 1 according to this embodiment is provided in a robot system (teaching system) 100 including a robot 20, a robot controller 30 for controlling the robot 20, a simulator 40, and a position measurement device (three-dimensional measurement instrument) 50.

The robot 20 performs a predetermined operation, such as spot welding, on a workpiece (not shown), includes multiple driven shafts, and includes multiple servo motors 11 for driving the driven shafts. Various servo motors, such as rotary motors and linear motors, can be used as the servo motors 11. Each servo motor 11 has a built-in operation position detector, such as an encoder, for detecting the operation position thereof, and a detection value obtained by the operation position detector is transmitted to the robot controller 30.

A processing tool (tool) 22 is attached to a flange 21 disposed at the tip of the robot 20.

Figure 2:
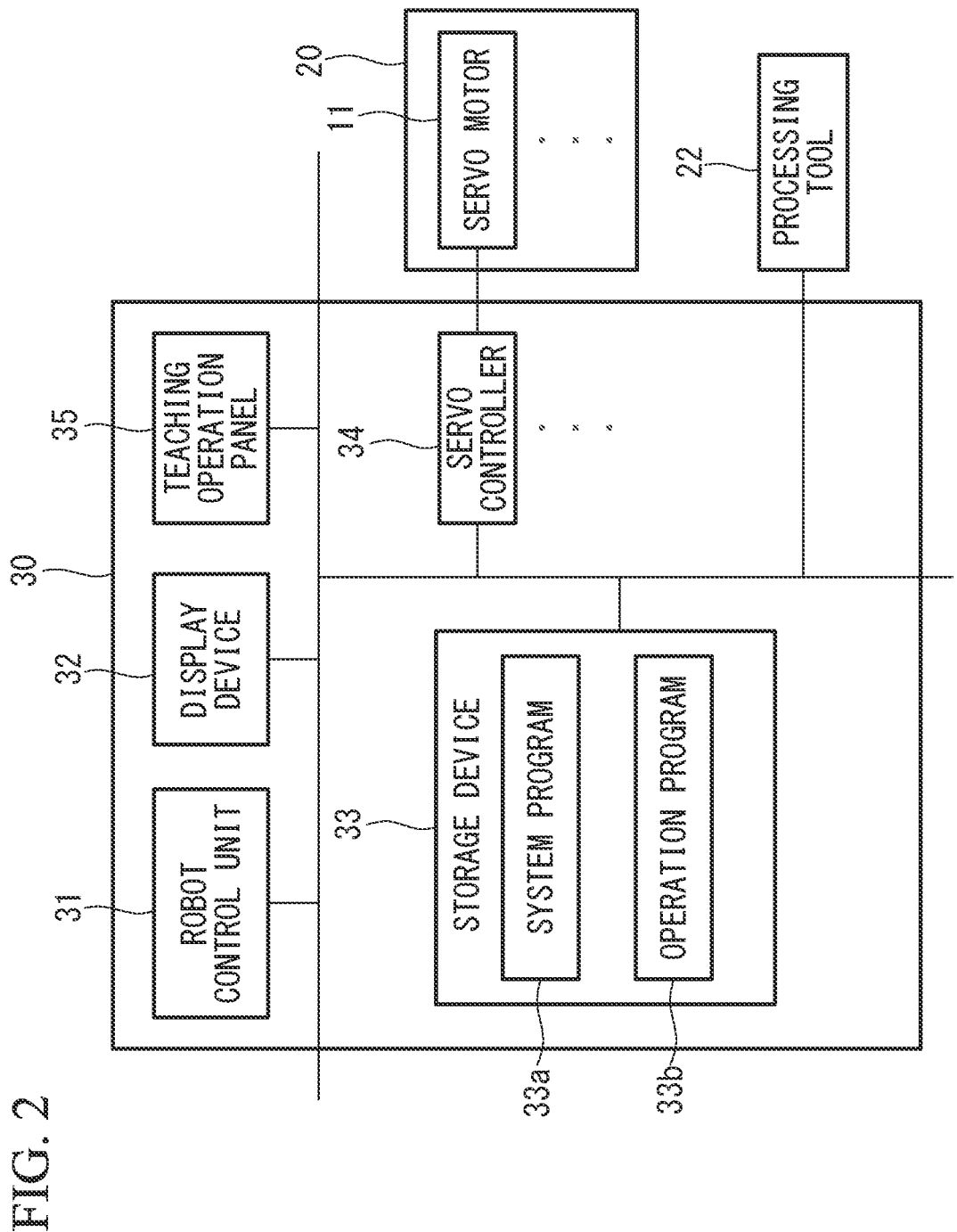
FIG. 2 is a block diagram showing a robot controller for controlling a robot in the robot system in FIG. 1.

As shown in FIG. 2, the robot controller 30 includes, for example: a robot control unit 31 including a CPU, a RAM, and the like; a display device 32; and a storage device 33 including a nonvolatile storage, a ROM, or the like. The robot controller 30 also includes multiple servo controllers 34 provided so as to correspond to the respective servo motors 11, and a teaching operation panel 35 that is connected to the robot controller 30 and can be carried by an operator.

Alternatively, the teaching operation panel 35 may be provided separately from the robot controller 30 and configured to wirelessly communicate with the robot controller 30.

The storage device 33 stores a system program 33a, and the system program 33a is responsible for the basic functions of the robot controller 30. The storage device 33 also stores at least one operation program 33b created by using the simulator 40. More specifically, a three-dimensional model of the robot 20 and a model of the workpiece are created on the simulator 40, and, for example, an operation program 33b for welding multiple welding points while avoiding interference between the robot 20 and the workpiece is created.

The robot control unit 31 is operated by the system program 33a, reads the operation program 33b stored in the storage device 33, and temporarily stores the operation program 33b in the RAM. Then, the robot control unit 31 sends control signals to the servo controllers 34 according to the read operation program 33b to control servo amplifiers of the servo motors 11 of the robot 20. The robot control unit 31 generates command values so that a command position of a flange center or a tool center point required in the operation program 33b is achieved with reference to a preset robot coordinate system.

Figure 3:
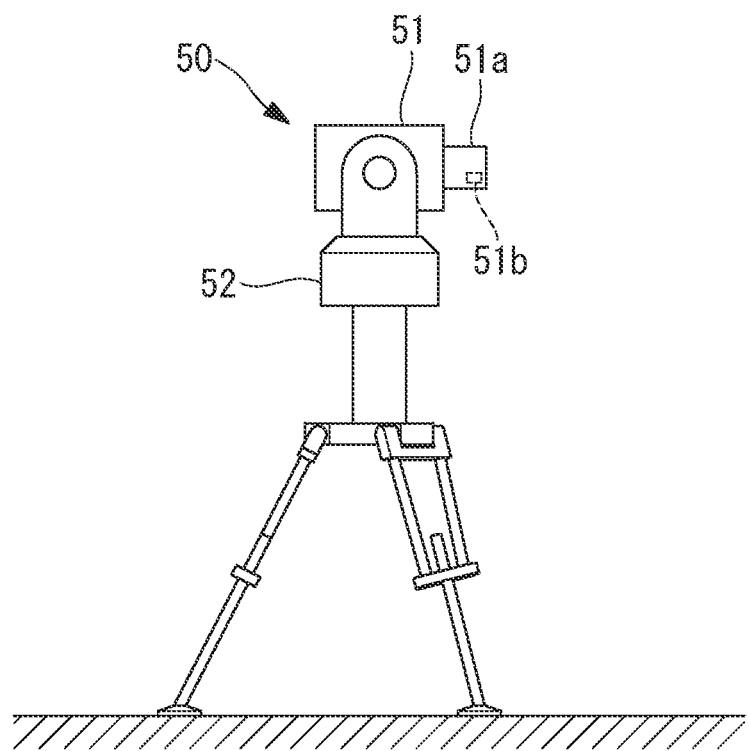
FIG. 3 is a side view showing a position measurement device provided in the robot system in FIG. 1.

As shown in FIG. 3, the position measurement device 50 includes a laser head 51 and a head driving unit 52. The laser head 51 emits a laser beam toward a reflector member fixed to the tool center point and receives reflected light from the reflector member. The reflector member is a spherical reflector fixed to the tool center point when the installation position of the robot 20 is measured.

The head driving unit 52 includes a vertical axis motor 53 and a horizontal axis motor 54 for changing the orientation of the laser head 51. The vertical axis motor 53 rotates the laser head 51 and the horizontal axis motor 54 about a vertical axis. The horizontal axis motor 54 rotates the laser head 51 about a horizontal axis.

The vertical axis motor 53 and the horizontal axis motor 54 are connected to a measurement control device 60 and controlled by the measurement control device 60. The vertical axis motor 53 and the horizontal axis motor 54 have built-in operation position detectors, such as encoders, for detecting the operation positions thereof, and detection values obtained by the operation position detectors are transmitted to the measurement control device 60.

The laser head 51 has a laser-beam emitting portion 51a, and a laser beam from a laser oscillator (not shown) is emitted from the laser-beam emitting portion 51a. A light-receiving sensor 51b for receiving light reflected by the reflector member or the like is provided in the laser-beam emitting portion 51a of the laser head 51. The laser head 51 is connected to the measurement control device 60. The measurement control device 60 controls the emission of the laser beam from the laser-beam emitting portion 51a of the laser head 51, and a detection result obtained by the light receiving sensor 51b is transmitted to the measurement control device 60.

Figure 4:
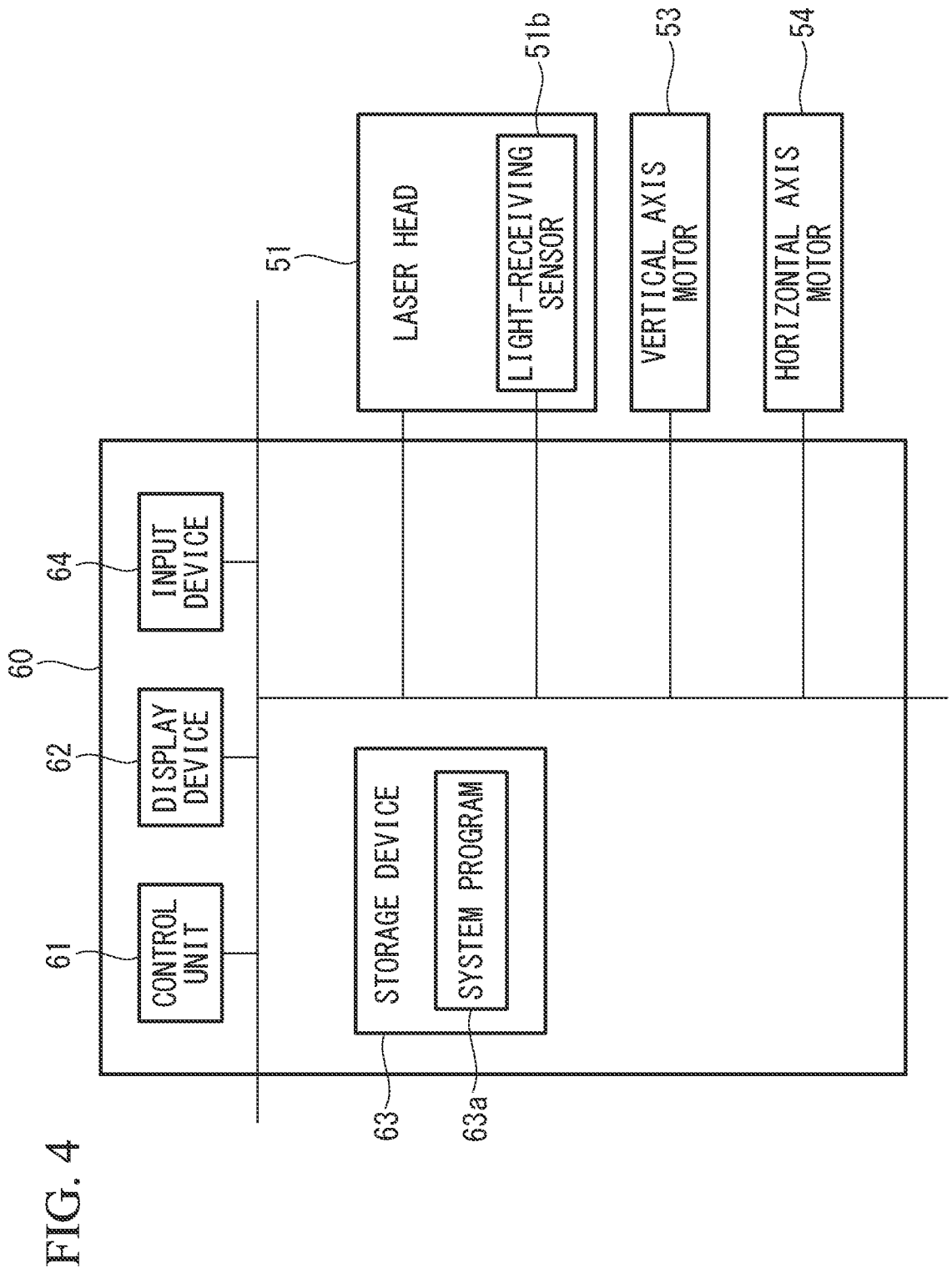
FIG. 4 is a block diagram showing a measurement control device for controlling the position measurement device in FIG. 3.

As shown in FIG. 4, the measurement control device 60 includes, for example: a control unit 61 having a CPU, a RAM, and the like; a display device 62; a storage device 63 having a nonvolatile storage, a ROM, and the like; and an input device 64. The input device 64 may be configured to wirelessly communicate with the measurement control device 60.

The storage device 63 stores a system program 63a, and the system program 63a is responsible for the basic functions of the measurement control device 60.

The measurement control device 60 may be built in the position measurement device 50 or may be provided at another position outside the position measurement device 50.

The simulator 40 is formed of a computer and stores three-dimensional models of one or more robots 20, processing tools 22, workpieces, peripheral devices, and the like. The simulator 40 can create an operation program by teaching the positions of multiple teaching points, the operation speed, and the like while moving the three-dimensional models of the robot 20 and the processing tool 22 with respect to the three-dimensional model of the workpiece. Furthermore, by executing the created operation program, the simulator 40 can cause the three-dimensional models of the robot 20 and the processing tool 22 to operate in accordance with the operation program to simulate interference checking, tact time measurement, and the like.

As a precondition for the simulator 40 to create the operation program, the robot 20 is installed at the origin of a designed robot coordinate system $R_0$ such that the x direction of the robot coordinate system $R_0$ is accurately aligned with the front direction of the robot 20. The position measurement device 50 is also set at the origin of a designed measurement coordinate system $L_0$ set with respect to the origin of the designed robot coordinate system $R_0$ described above. Furthermore, the size and the shape of the processing tool 22 to be attached to the flange 21 of the robot 20 are set according to the design values, and a designed tool coordinate system $T_0$ viewed from a flange coordinate system $F_0$ is set.

The installation position measurement device 1 according to this embodiment is a device including a CPU, a RAM, and the like, and is connected to the robot controller 30, the simulator 40, and the position measurement device 50, as shown in FIG. 1.

Figure 5:
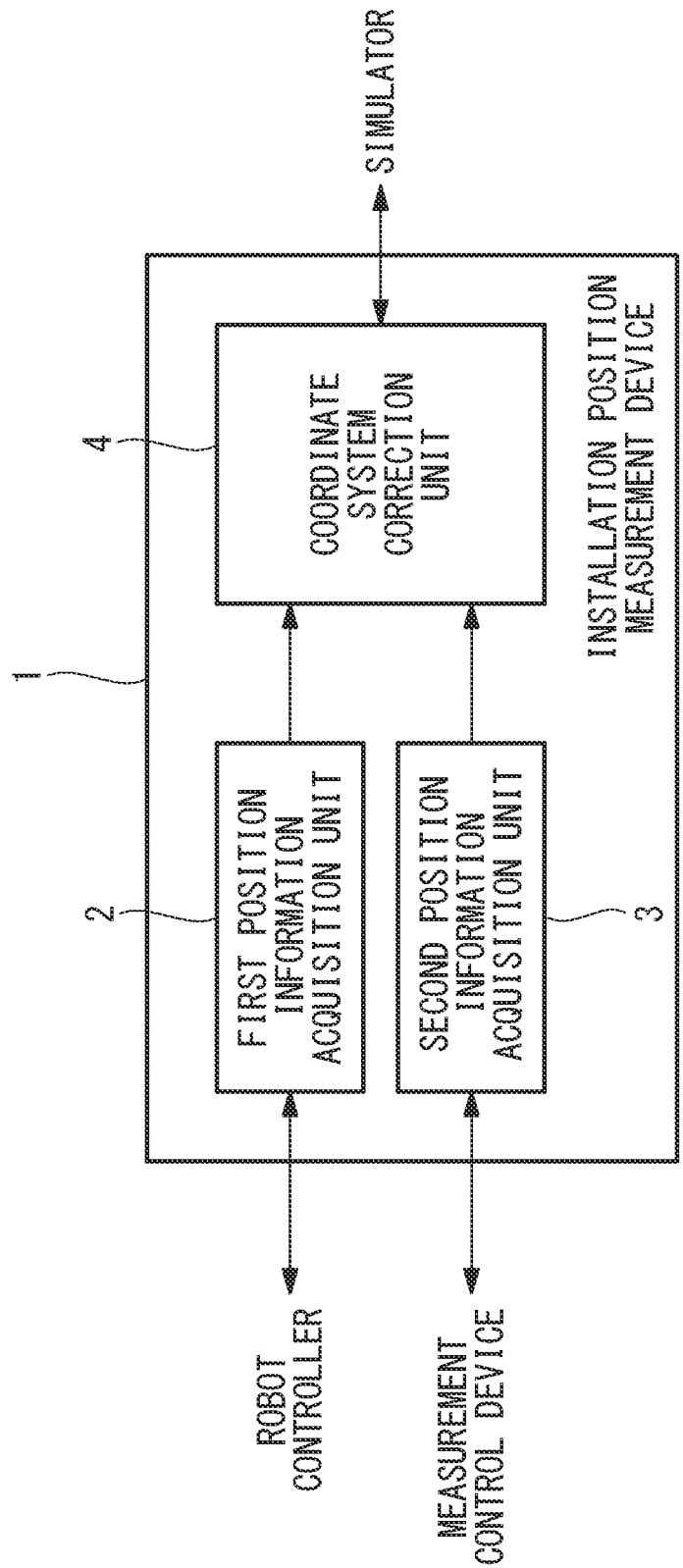
FIG. 5 is a block diagram showing the installation position measurement device in FIG. 1.

As shown in FIG. 5, the installation position measurement device 1 includes a first position information acquisition unit 2, a second position information acquisition unit 3, and a coordinate system correction unit 4.

The first position information acquisition unit 2 instructs the robot controller 30 to operate to position the robot 20 in multiple poses and acquires position information (first position information) of the tool center point at the command positions with the poses instructed by the robot controller 30. At this point in time, the robot coordinate system (robot coordinate system, world coordinate system) where the robot 20 operates is a designed coordinate system set by the simulator 40, and the command positions are also designed position information calculated on the basis of the design values.

The second position information acquisition unit 3 instructs the measurement control device 60 to operate and causes the position measurement device 50 to measure the three-dimensional position of the reflector member disposed at the tool center point of the actual robot 20, and acquires the measured position information (second position information) from the position measurement device 50. The position information acquired at this point in time is the actual position information of the tool center point viewed from a measurement coordinate system (unknown) where the actual position measurement device 50 is set.

The coordinate system correction unit 4 corrects the robot coordinate system by the following method on the basis of the position information of the command positions of the tool center point acquired by the first position information acquisition unit 2 and the actual position information of the tool center point acquired by the second position information acquisition unit 3.

Figure 6:
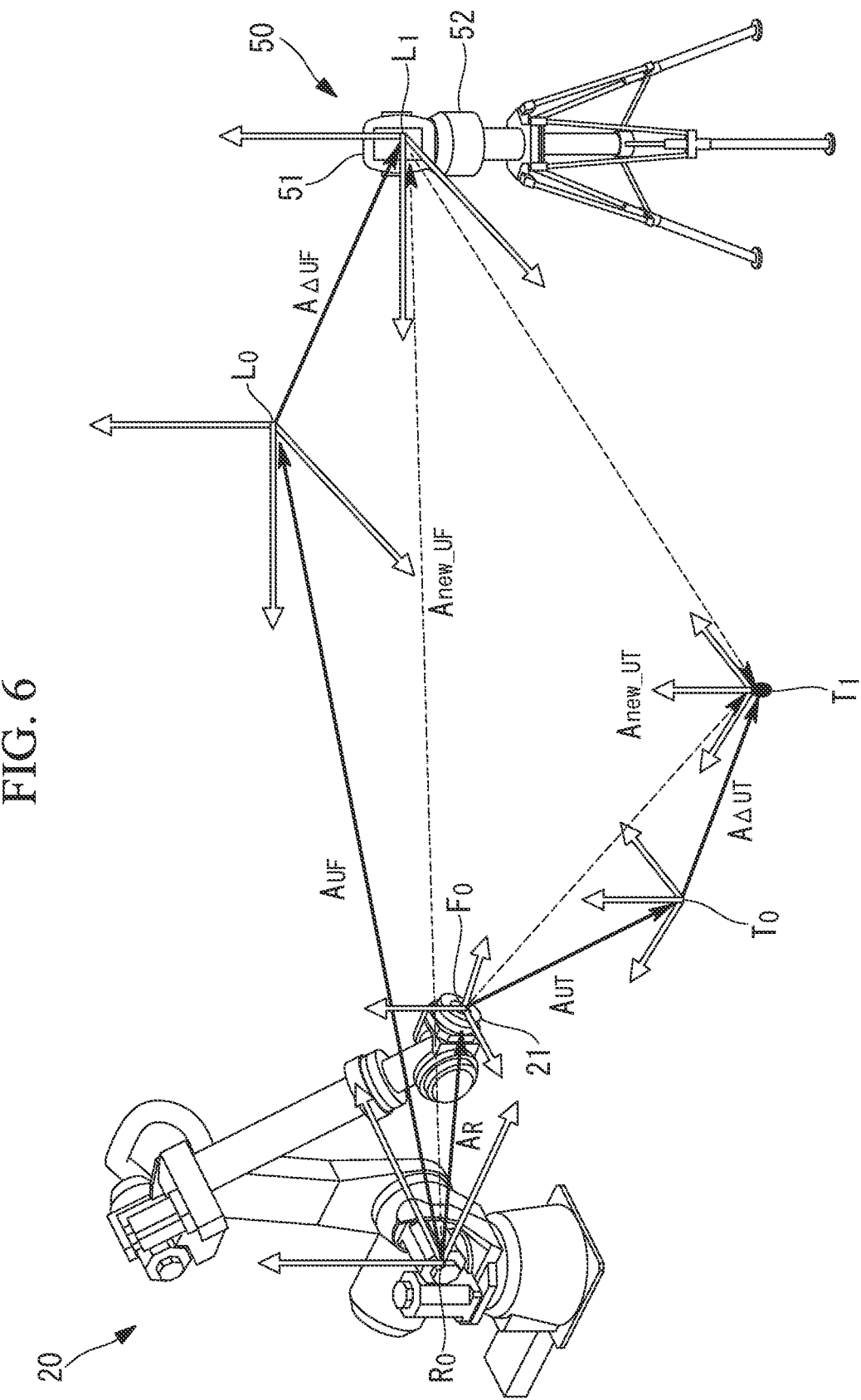
FIG. 6 is an explanatory diagram of coordinate systems and homogeneous transformation matrices for explaining an installation position measurement method according to an embodiment of the present disclosure.

Specifically, as shown in FIG. 6, the position and the orientation of the designed measurement coordinate system $L_0$ viewed from the designed robot coordinate system $R_0$ are set in advance in the simulator 40, as described above. This is expressed by a homogeneous transformation matrix $A_{UF}$.

The flange coordinate system $F_0$ viewed from the designed robot coordinate system $R_0$ and the designed tool coordinate system $T_0$ located at the tool center point can also be expressed by homogeneous transformation matrices $A_R$ and $A_{UT}$, respectively.

Although the position and the orientation of the actual measurement coordinate system $L_1$ are unknown, there are usually differences between the designed measurement coordinate system $L_0$ and the actual measurement coordinate system $L_1$, and the actual measurement coordinate system $L_1$ viewed from the designed measurement coordinate system $L_0$ can be expressed by a homogeneous transformation matrix $A_{\Delta UF}$.

There are also usually errors between the designed tool coordinate system $T_0$ and the actual tool coordinate system $T_1$, and the actual tool coordinate system $T_1$ viewed from the designed tool coordinate system $T_0$ can be expressed by a homogeneous transformation matrix $A_{\Delta UT}$.

By using these homogeneous transformation matrices, Expression (1) below is established.

$$P = A^{-1}_{\Delta UF}(A^{-1}_{UF}A_R)A_{UT}A_{\Delta UT} \quad (1)$$

Here, P is a homogeneous transformation matrix calculated from the designed command position of the tool center point viewed from the designed measurement coordinate system $L_0$, and $A^{-1}_{\Delta UF}$ and $A^{-1}_{UF}$ are inverse matrices of $A_{\Delta UF}$ and $A_{UF}$, respectively.

The actual position information of the tool center point viewed from the actual measurement coordinate system $L_1$ is acquired by the position measurement device 50.

By moving the robot 20 to multiple poses, the coordinate system correction unit 4 calculates, for each pose, the difference between the actual position information acquired by the position measurement device 50 and the position information of the command position of the tool center point acquired by Expression (1), and identifies the homogeneous transformation matrices $A_{\Delta UF}$ and $A_{\Delta UT}$ with which the difference becomes small (for example, the difference is minimum).

By using the thus-obtained homogeneous transformation matrix $A_{\Delta UF}$, the actual measurement coordinate system $L_1$ viewed from the actual robot coordinate system is obtained by a homogeneous transformation matrix $A_{new\_UF}$, shown in Expression (2) below.

$$A_{new\_UF} = A_{UF}A_{\Delta UF} \quad (2)$$

Hence, the actual robot coordinate system viewed from the actual measurement coordinate system $L_1$ can be obtained by calculating the inverse matrix of the homogeneous transformation matrix $A_{new\_UF}$.

The coordinate system correction unit 4 sends the thus-obtained corrected robot coordinate system to the simulator 40 and corrects the designed robot coordinate system $R_0$ set in the simulator 40 by replacing it with the corrected robot coordinate system.

Then, by performing, in the simulator 40, an offline simulation of the operation program using the corrected actual robot coordinate system, it is possible to correct the operation program so that the robot 20 and the processing tool 22 do not interfere with the workpiece or peripheral devices.

An installation position measurement method using the thus-configured installation position measurement device 1 according to this embodiment will be described below.

Figure 7:
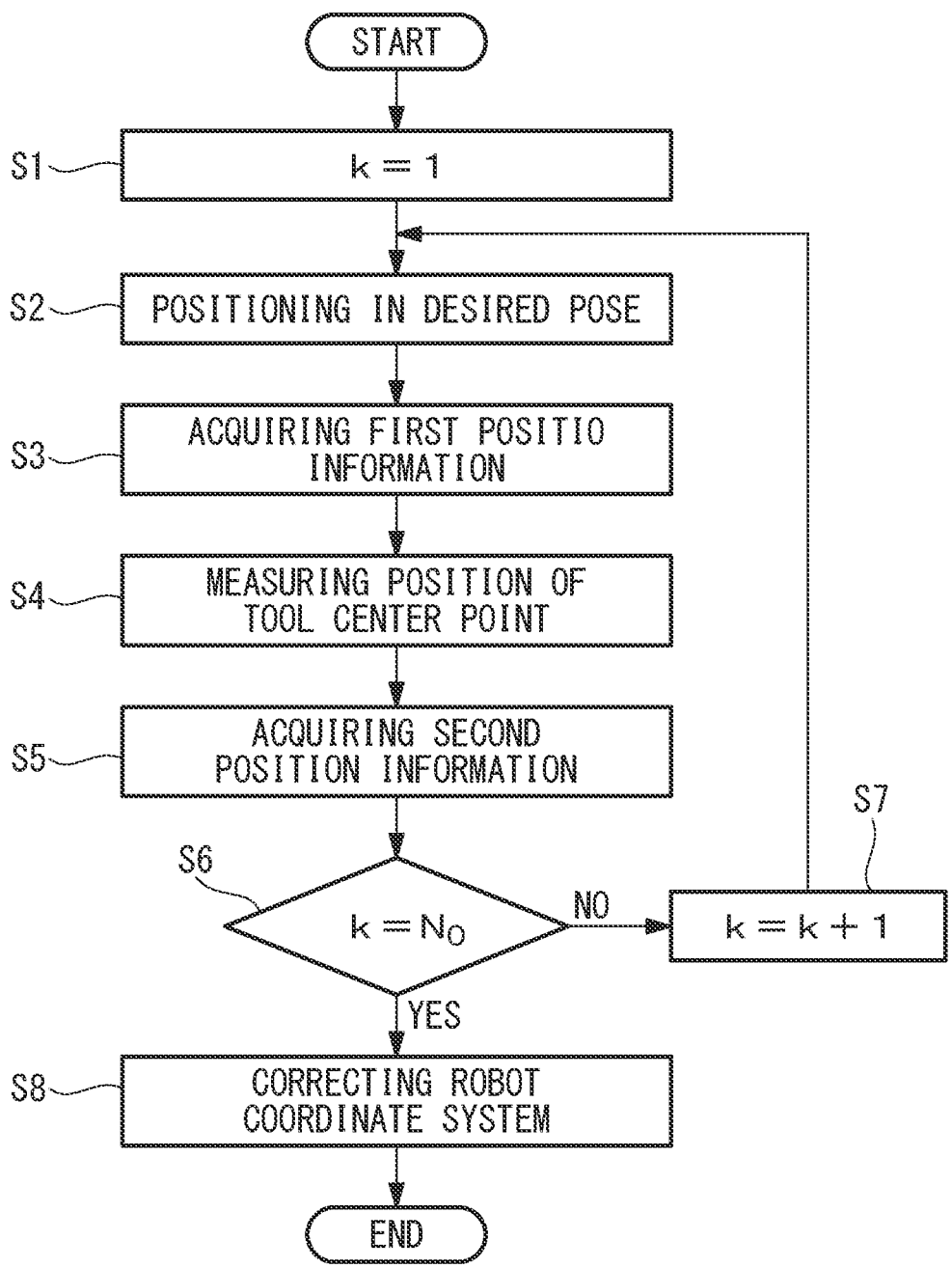
FIG. 7 is a flowchart explaining the installation position measurement method in FIG. 6.

In the installation position measurement method according to this embodiment, as shown in FIG. 7, the measurement number k is initialized (step S1), and the robot controller 30 controls the robot 20 on the basis of a command from the first position information acquisition unit 2 and positions the robot 20 in a desired pose (step S2). The first position information, which is the command position of the tool center point at this time, is sent from the robot controller 30 to the first position information acquisition unit 2 and stored therein (step S3).

Next, in the pose positioned in step S2, the measurement control device 60 controls the position measurement device 50 on the basis of a command from the second position information acquisition unit 3 and causes the position measurement device 50 to measure the position of the tool center point (step S4). The second position information, which is the measured position information of the tool center point, is sent to and stored in the second position information acquisition unit 3 (step S5).

Next, whether or not the measurement number k has reached a designated number $N_0$ is determined (step S6), and, when the measurement number k has not reached the designated number $N_0$, the measurement number k is incremented (step S7), and the process is repeated from step S2. The designated number $N_0$ is, for example, $N_0=3$.

When the measurement number k reaches the designated number $N_0$, all the stored first position information and second position information are sent to the coordinate system correction unit 4, and the robot coordinate system is corrected by the coordinate system correction unit 4 (step S8).

As described above, with the installation position measurement device 1 and the installation position measurement method according to this embodiment, it is possible to correct the robot coordinate system by positioning the robot 20 in multiple poses and measuring the positions of the reflector member fixed to the tool center point. Hence, unlike the related-art method in which the measurement points on the reference plane on which the robot 20 is installed and the reflectors provided at the base of the robot 20 are used, there is an advantage in that it is possible to easily correct the robot coordinate system without interference with peripheral devices, even when the production cell is complicated.

In this embodiment, although the coordinate system correction unit 4 simultaneously identifies the homogeneous transformation matrices $A_{\Delta UF}$ and $A_{\Delta UT}$ with which the difference between the first position information and the second position information becomes small, it is also possible that only one of them is identified. For example, when the actual measurement coordinate system $L_1$ is accurately aligned with the designed measurement coordinate system $L_0$, or when the actual tool coordinate system $T_1$ is accurately aligned with the designed tool coordinate system $T_0$, it is sufficient to identify only one of the homogeneous transformation matrices.

In this embodiment, an example of the first information received by the first position information acquisition unit 2 from the robot controller 30 is the command position of the tool center point. Alternatively, the first position information acquisition unit 2 may acquire the first position information by receiving the origin position of the flange coordinate system $F_0$ from the robot controller 30 and calculating the position of the tool center point.

Figure 8:
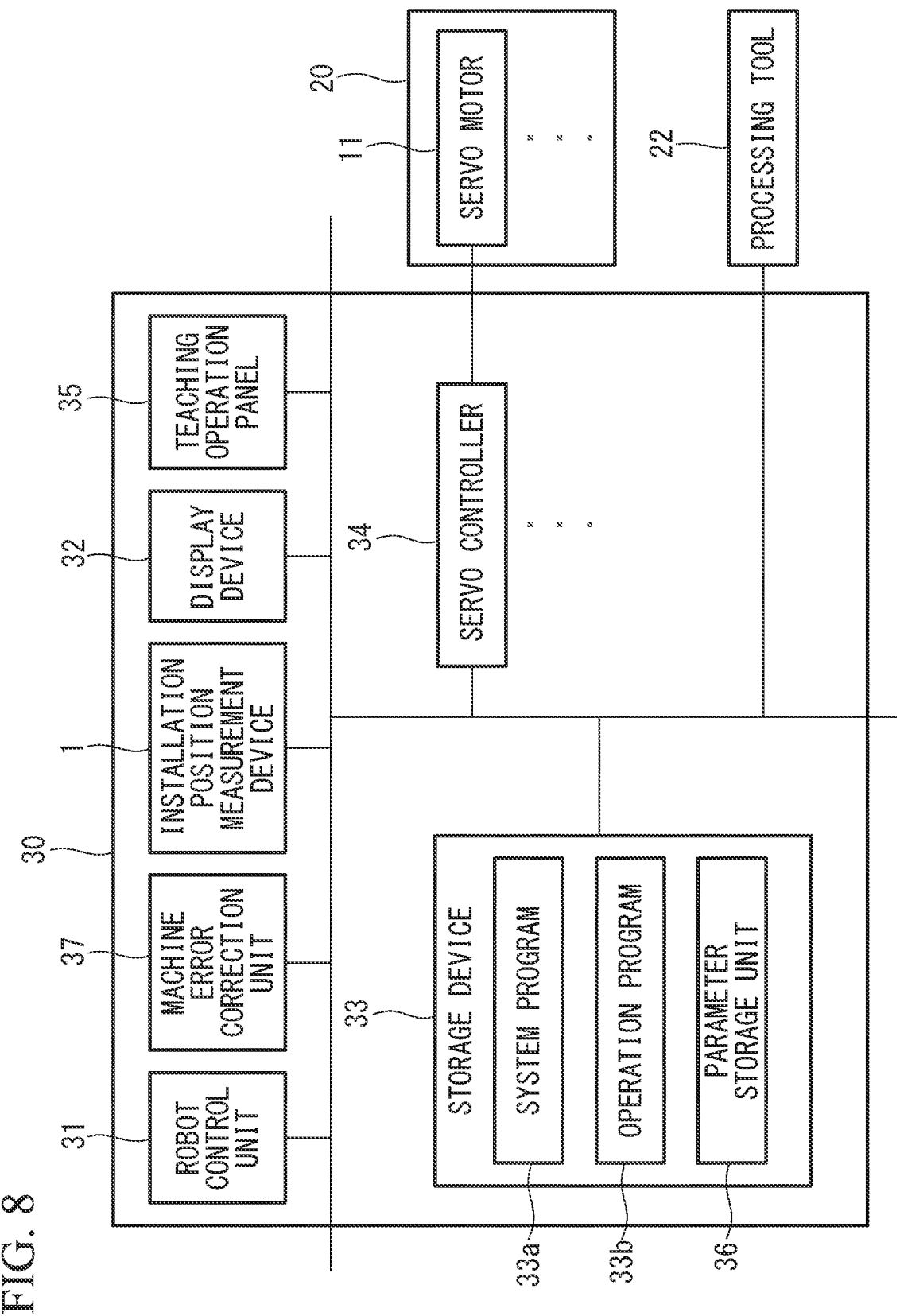
FIG. 8 is a block diagram showing a robot controller according to an embodiment of the present disclosure.

Although an example in which the installation position measurement device 1 is provided separately from the robot controller 30 has been described in this embodiment, instead of this, as shown in FIG. 8, the installation position measurement device 1 may be provided in the robot controller 30.

In this case, the robot controller 30 may include a parameter storage unit 36 that stores multiple error parameters used to calculate the accurate position of the tool center point from the command values for the robot 20, and a machine error correction unit 37 that corrects machine errors by a known method, using the error parameters stored in the parameter storage unit 36. Examples of the machine errors include Denavit-Hartenberg parameters (D-H parameters) and gravity springs.

The robot control unit 31 corrects, with the machine error correction unit 37, the machine errors (deviations) using the error parameters and generates such command values that the calculated command position is the command position required in the operation program. This way, it is possible to improve the accuracy of the command value acquired from the robot control unit 31 in correcting the robot coordinate system, and to obtain a more accurate robot coordinate system.

The correction of the machine errors may be performed by calibration in advance or may be performed simultaneously with calibration of the tool coordinate system and the robot coordinate system by the machine error correction unit 37 provided in the robot controller 30.

Furthermore, in this embodiment, the coordinate system correction unit 4 may determine the degree of dependence among the error parameters, and, when it is determined that the degree of dependence is high, identification of the corresponding vector in the tool coordinate system may not be performed.

There are nine error parameters related to the measurement of the installation position of the robot 20, which are correction values $(x_a, y_a, z_a, w_a, p_a, r_a)$ of the measurement coordinate system, and the correction values $(x_b, y_b, z_b)$ of the tool vector.

Assuming that a vector having these error parameters as elements is q, a vector p indicating the three-dimensional position of the tool center point can be expressed as follows using a function f that takes into consideration the error model.

$$p=f(q)$$

A vector $\Delta p$, which indicates the amount of deviation between the position information of the command position of the tool center point and the measured actual position information, can be approximated by the sum of linear combinations of minute variations of the error parameters. Note that JA is the Jacobian.

$$\Delta p=(\partial p/\partial q)\cdot \Delta q=JA\cdot \Delta q$$

Because the laser tracker performs three-dimensional measurement, three equations hold from one measurement orientation. When these are extended to multiple measurement orientations, a vector $\Delta r$ and a Jacobian D indicating the amount of deviation corresponding to them are obtained, which can be expressed as follows.

$$\Delta r=D\cdot \Delta q$$

It is common to identify the error parameters by solving an iterative estimation problem that minimizes $\Delta r$.

Assuming that the number of equations is N and the number of error parameters is M, the Jacobian D is given as follows.

$$[D] = \begin{bmatrix} D11 & D12 & \ldots & D1m \\ D21 & D22 & \ldots & D2m \\ \vdots & \vdots & \ddots & \vdots \\ Dn1 & Dn2 & \ldots & Dnm \end{bmatrix} \quad \text{Expression 1}$$

If the number of equations is greater than the number of unknowns, general least-squares problems can be solved by converting $[D]\{p\}=\{q\}$ to $[D]^T[D]\{p\}=[D]^T\{q\}$ to obtain the following expression:

$$[D]^T[D] = \begin{bmatrix} D11 & D12 & \ldots & D1m \\ D21 & D22 & \ldots & D2m \\ \vdots & \vdots & \ddots & \vdots \\ Dm1 & Dm2 & \ldots & Dmm \end{bmatrix} \quad \text{Expression 2}$$

$[D]^T[D]$ is an M by M matrix.

The degree of dependence can be determined by calculating the inner product Q of the unit vectors of the column vectors of $[D]^T[D]$, and, for example, when $0.9<Q\leq 1$, it is determined that the degree of dependence is high.

For example, when the z-axis directions of the measurement coordinate system and the tool coordinate system are aligned, and the measurement orientations are the orientations achieved by rotating the tool coordinate system only about the Z-axis, the z components of the measurement coordinate system and the tool coordinate system are in a dependent relationship. For example, when the amount of correction of the z component of the measurement coordinate system is a first error parameter and the amount of correction of the z component of the tool coordinate system is a second error parameter, the inner product Q of the first column vectors and the second column unit vectors of the $[D]^T[D]$ satisfies the above condition. When the degree of dependence is high, the coordinate system correction unit 4 does not identify the corresponding vector of the tool coordinate system, that is, does not calculate the amount of correction of the z component of the tool coordinate system.

When the processing tool 22 fixed to the flange 21 of the robot 20 is, for example, a servo gun having an equalizing mechanism, and when the orientation of the tool is changed in the z-axis direction of the tool coordinate system, which is a pressing direction, the position of the tool center point changes due to its own weight by design. When the position of the tool center point changes, the errors increase, deteriorating the calculation accuracy. Hence, in the operation of the robot 20 in correcting the robot coordinate system, the tool is positioned in multiple orientations with which the servo gun is held in such orientations in which the position of the tool center point does not change due to its own weight.

In this case, the z component of the tool coordinate system and the z component of the measurement coordinate system are oriented in almost the same direction, and it can be said that the degree of dependence is high. When the degree of dependence is high, because it cannot be distinguished which of the z component of the tool coordinate system and the z component of the measurement coordinate system should be corrected, the two homogeneous transformation matrices $A_{\Delta UF}$ and $A_{\Delta UT}$ cannot be correctly identified. Hence, when it is determined that the degree of dependence is high, it is possible to accurately set the robot coordinate system by using values in the drawings and values measured in advance, without performing calculation in the z-axis direction of the tool coordinate system.

Alternatively, error parameters having small eigenvalues may be excluded from the error parameter group until the ratio of the maximum eigenvalue to the minimum eigenvalue of $[D]^T[D]$ reaches a certain constant value. This way, for example, it is possible to detect that the measurement orientations are significantly close to each other and thus the amount of correction of the measurement coordinate system cannot be accurately calculated, and to notify that fact in advance.

The Jacobian D can be calculated before the position information is obtained by measurement, and using the Jacobian D makes it possible to know which error parameter is to be calculated before measurement is started. By knowing in advance the case where the component of the tool coordinate system to be calculated will not be calculated or cannot be accurately calculated, it is possible to examine the orientations to be measured in advance.

Figure 9:
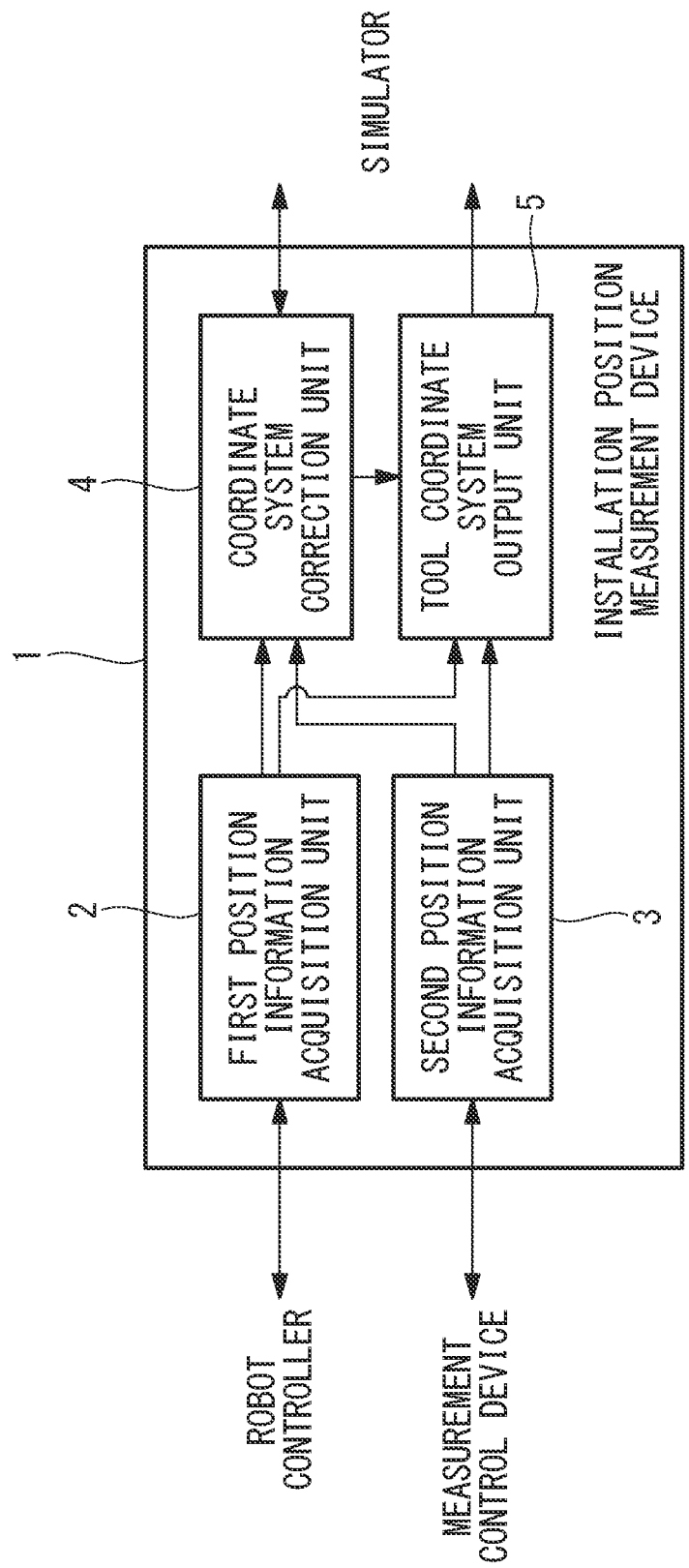
FIG. 9 is a block diagram showing a modification of the installation position measurement device in FIG. 5.

In this embodiment, as shown in FIG. 9, the installation position measurement device 1 may include a tool coordinate system output unit 5.

After the coordinate system correction unit 4 has corrected the robot coordinate system, the tool coordinate system output unit 5 positions the robot 20 in a desired pose, calculates the tool coordinate system by the following method, and outputs the tool coordinate system.

Specifically, the tool coordinate system output unit 5 receives the robot coordinate system corrected by the coordinate system correction unit 4. Then, the tool coordinate system output unit 5 calculates the position of the tool coordinate system on the basis of the command position of the origin of the flange coordinate system (first position information) acquired from the robot controller 30 and the actual position of the tool center point (second position information) acquired from the position measurement device 50.

After the robot coordinate system is corrected, because the robot coordinate system and the measurement coordinate system are accurately corrected, the homogeneous transformation matrix $A_{UF}$ of the measurement coordinate system viewed from the robot coordinate system is known.

The homogeneous transformation matrix $A_R$ of the flange coordinate system viewed from the robot coordinate system can also be accurately calculated on the basis of the command position acquired from the robot controller 30.

Then, by obtaining the homogeneous transformation matrix P on the basis of the actual tool center point viewed from the measurement coordinate system acquired from the position measurement device 50, the homogeneous transformation matrix $A_{UT}$ of the tool coordinate system viewed from the origin of the flange coordinate system can be calculated by Expression (3).

$$A_{UT} = A_R^{-1} A_{UF} P \quad (3)$$

Then, the tool coordinate system output unit 5 extracts and outputs only the position component of the homogeneous transformation matrix $A_{UT}$. Thus, it is possible to output the tool coordinate system in a state in which the robot 20 is positioned in one pose, and thus to reduce the required time. When the tool coordinate system changes with changes in the orientation of the processing tool 22, it may be desired to create a table of tool coordinate systems corresponding to the orientations of the tool. In this case, it is possible to obtain the tool coordinate system for each desired orientation, which is advantageous.

Even in the case where the tool coordinate system output unit 5 calculates the tool coordinate system, if the robot controller 30 has corrected the machine errors using the error parameters, it is possible to acquire a more accurate command value, and thus to obtain a more accurate tool coordinate system.

Next, a teaching system 100 according to an embodiment of the present disclosure will be described below with reference to the drawings.

The teaching system 100 according to this embodiment is formed of a robot system including: the robot 20; the robot controller 30 for controlling the robot 20; the simulator 40; the position measurement device (three-dimensional measurement instrument) 50; and the installation position measurement device 1, which have been described above. The simulator 40 includes a display device (updating unit) 41, such as a display, and an input device (updating unit) (not shown), such as a mouse or a keyboard.

Figure 10:
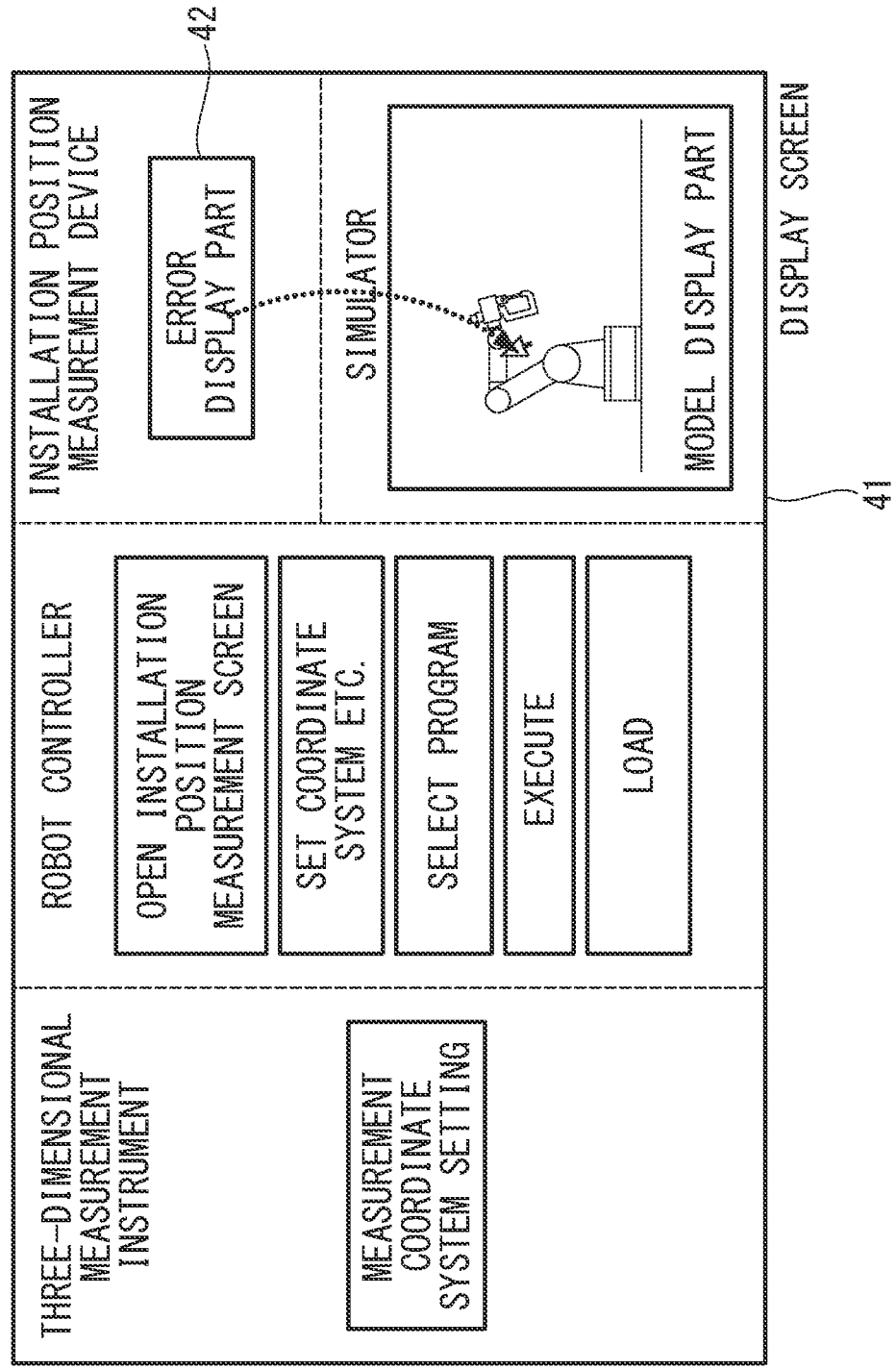
FIG. 10 is an example display screen showing a teaching system according to an embodiment of the present disclosure.

FIG. 10 shows a display example on a display screen of the display device 41 of the simulator 40.

In the example shown in FIG. 10, a setting button for setting a measurement coordinate system of the position measurement device 50, which is a three-dimensional measurement instrument, is displayed on the left side of the display screen. The operator can input information about the measurement coordinate system by pressing the measurement coordinate system setting button.

At the center of the display screen shown in FIG. 10, buttons indicating operations for the robot controller 30 or the teaching operation panel 35 are displayed.

By pressing the "open installation position measurement screen" button, an installation position measurement screen is displayed on the display device 32 of the robot controller 30.

By pressing the "set coordinate system etc." button, it is possible to perform switching between enabling and disabling of calculation of the tool coordinate system, switching between enabling and disabling of calculation of the robot coordinate system, input of a designed robot coordinate system and tool coordinate system, load setting, and the like.

By pressing the "select program" button, it is possible to designate a program to be operated by the robot 20 in measuring the installation position. When a program is designated, the designated program is converted to a measurement program in which a command for measurement with the three-dimensional measuring machine is added after each operation line.

By pressing the "execute" button, the robot controller 30 operates the robot 20 on the basis of the set measurement program, and the installation position measurement device 1 calculates the corrected robot coordinate system.

The "error display part 42", which is to display information of differences between the robot coordinate system corrected by the installation position measurement device 1 and the robot coordinate system before correction, is located on the upper right side of the display screen shown in FIG. 10. The error information displayed on the error display part 42 may be displayed as numerical values or may be displayed as the figures of the robot coordinate system before and after correction, superimposed on each other.

A model display part 43 for displaying a three-dimensional model of the robot 20 or the like acquired from the simulator 40 is provided on the lower right side of the display screen shown in FIG. 10.

On this display screen, error information displayed in the error display part 42 can be moved (applied) to the model display part 43 by dragging it with a mouse, for example. By doing so, it is possible to update the display of the three-dimensional model of the robot 20 to which the robot coordinate system before correction is set, which is displayed on the model display part 43, with the display of a three-dimensional model of the robot 20 to which the corrected robot coordinate system is set.

Instead of or in addition to updating the display on the model display part 43, an operation program created offline in the simulator 40 may be updated using the error information. Specifically, the simulator 40 includes a receiving unit that receives error information of the robot coordinate system before and after correction, and the simulator 40 applies the received error information to an operation program created based on the designed robot coordinate system $R_0$ to update the operation program with an operation program based on the corrected robot coordinate system.

More specifically, the position of each teaching point in the operation program created on the basis of the robot coordinate system before correction is shifted on the basis of the error information of the robot coordinate system. By executing the thus-updated operation program offline in the simulator, it is possible to perform operation confirmation, such as interference checking.

Then, by pressing a "load" button at the lower center of the display screen shown in FIG. 10, the operation program updated in the simulator 40 is loaded into the robot controller 30. By doing so, it is possible to operate the robot 20 using the operation program whose operation has been confirmed offline using a three-dimensional model.

In the description of the teaching system 100, although the display screen in FIG. 10 is displayed on the display device 41 provided in the simulator 40, instead, the display screen may be displayed on a display device attached to another computer.

Furthermore, although an example case where the installation position measurement device 1 is disposed separately from the robot controller 30 has been described, the installation position measurement device 1 may be incorporated in the robot controller 30.

The invention claimed is:

1. A robot installation position measurement device comprising:
 a first position information acquisition unit that acquires first position information, which is a three-dimensional command position of a tool center point fixed with respect to a flange at a tip of a robot, in a state in which the robot is positioned in a desired pose;
 a second position information acquisition unit that acquires, by a three-dimensional measurement instrument installed with a predetermined measurement coordinate system, second position information, which is a three-dimensional actual position of the tool center point in the pose; and
 a coordinate system correction unit that corrects a robot coordinate system, with which the robot operates, such that a difference between pieces of the first position information and pieces of the second position information acquired in states in which the robot is positioned in multiple different poses becomes small.

2. The robot installation position measurement device according to claim 1, wherein the coordinate system correction unit identifies at least one of a tool coordinate system for defining a position and an orientation of the tool center point seen from an origin of a flange coordinate system fixed with respect to the flange, and the measurement coordinate system seen from an origin of the robot coordinate system, and the coordinate system correction unit corrects the robot coordinate system based on the identified tool coordinate system and/or the identified measurement coordinate system such that the difference between the pieces of the first position information and the pieces of the second position information becomes small.

3. The robot installation position measurement device according to claim 2, wherein the coordinate system correction unit simultaneously identifies both the tool coordinate system and the measurement coordinate system such that the difference between the pieces of the first position information and the pieces of the second position information becomes small.

4. The robot installation position measurement device according to claim 3, wherein the coordinate system correction unit determines degrees of dependence of vectors that define orientations of the tool coordinate system and the measurement coordinate system and does not identify one or more vectors of the vectors whose degrees of dependence are high.

5. The robot installation position measurement device according to claim 2, further comprising a tool coordinate system output unit that calculates the tool coordinate system based on a command position of the origin of the flange coordinate system seen from the robot coordinate system corrected by the coordinate system correction unit and the actual position of the tool center point acquired by the three-dimensional measurement instrument in a state in which the robot is positioned in a desired pose, and outputs the tool coordinate system.

6. A robot controller comprising:
 the robot installation position measurement device according to claim 1;
 a parameter storage unit that stores a plurality of error parameters used to calculate an accurate position of the tool center point from a command value for the robot; and
 a machine error correction unit that corrects machine errors of the robot using the error parameters stored in the parameter storage unit.

7. A teaching system comprising:
 the robot installation position measurement device according to claim 1;
 a simulator capable of creating an operation program offline based on a three-dimensional model of the robot;
 a model display part capable of conducting display of the three-dimensional model of the robot;
 an error display part that displays error information representing an error between a robot coordinate system before correction set in the simulator and a robot coordinate system corrected in the installation position measurement device; and
 an updating unit that updates at least one of the display of the three-dimensional model on the model display part and the operation program stored in the simulator based on the error information by applying the error information displayed on the error display part to the three-dimensional model displayed on the model display part.

8. A robot installation position measurement method comprising:
- positioning a robot in two or more poses;
- acquiring first position information, which is a three-dimensional command position of a tool center point fixed with respect to a flange at a tip of the robot, for each of the poses;
- acquiring, by a predetermined three-dimensional measurement instrument installed with a predetermined measurement coordinate system, second position information which is a three-dimensional actual position of the tool center point, for each of the poses; and
- conducting correction of a robot coordinate system, with which the robot operates, such that difference between pieces of the acquired first position information and pieces of the second position information becomes small.

9. The robot installation position measurement method according to claim 8, wherein the correction of the robot coordinate system includes: identifying at least one of a tool coordinate system for defining a position and an orientation of the tool center point seen from an origin of a flange coordinate system fixed with respect to the flange, and the measurement coordinate system seen from an origin of the robot coordinate system; and correcting the robot coordinate system based on the identified tool coordinate system and/or the identified measurement coordinate system such that the difference becomes small.

10. The robot installation position measurement method according to claim 9, wherein the correction of the robot coordinate system includes simultaneously identifying both the tool coordinate system and the measurement coordinate system such that the difference becomes small.

11. The robot installation position measurement method according to claim 10, wherein the correction of the robot coordinate system includes determining degrees of dependence of vectors that define orientations of the tool coordinate system and the measurement coordinate system, and the correction of the robot coordinate system does not identify one or more vectors of the vectors whose degrees of dependence are high.

12. A simulator capable of creating an operation program offline based on a three-dimensional model of a robot, the simulator comprising:
- a model display part capable of displaying the three-dimensional model of the robot;
- a receiving unit capable of receiving error information representing an error of a robot coordinate system; and
- an updating unit that updates at least one of the display of the three-dimensional model on the model display part and the operation program based on the error information by applying the error information to the three-dimensional model displayed on the model display part.

* * * * *